(12) United States Patent
Nielsen et al.

(10) Patent No.: US 11,898,534 B2
(45) Date of Patent: Feb. 13, 2024

(54) HINGED BLADE WIND TURBINE WITH TILTED AXIS AND/OR CONED ROTOR

(71) Applicant: VESTAS WIND SYSTEMS, Aarhus N. (DK)

(72) Inventors: Thomas S. Bjertrup Nielsen, Randers SV (DK); Søren Dalsgaard, Hadsten (DK); Brian Jørgensen, Galten (DK); Kim Hylling Sørensen, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/776,206

(22) PCT Filed: Nov. 10, 2020

(86) PCT No.: PCT/DK2020/050305
§ 371 (c)(1),
(2) Date: May 11, 2022

(87) PCT Pub. No.: WO2021/093924
PCT Pub. Date: May 20, 2021

(65) Prior Publication Data
US 2022/0381222 A1 Dec. 1, 2022

(30) Foreign Application Priority Data

Nov. 12, 2019 (DK) .......................... PA 2019 70692

(51) Int. Cl.
*F03D 1/06* (2006.01)
*F03D 7/02* (2006.01)
(52) U.S. Cl.
CPC ......... *F03D 1/0633* (2013.01); *F03D 1/0677* (2023.08); *F05B 2240/31* (2013.01)

(58) Field of Classification Search
CPC .... F03D 1/0608; F03D 1/0625; F03D 1/0633; F03D 1/0641; F03D 1/065; F03D 1/0666; F03D 1/0675; F03D 1/0683; F03D 7/0236
See application file for complete search history.

(56) References Cited

U.S. PATENT DOCUMENTS

| 173,676 A | 2/1876 | Sawyer |
| 279,194 A | 6/1883 | Sickles |

(Continued)

FOREIGN PATENT DOCUMENTS

| EP | 2075464 A2 | 7/2009 |
| EP | 2598750 A2 | 6/2013 |

(Continued)

OTHER PUBLICATIONS

Danish Patent and Trademark Office, 1st Technical Examination including the Search Report for Application PA 2019 70692 dated May 26, 2020.

(Continued)

*Primary Examiner* — Justin D Seabe
(74) *Attorney, Agent, or Firm* — Patterson + Sheridan, LLP

(57) ABSTRACT

A wind turbine comprising one or more wind turbine blades arranged to perform pivot movements between a minimum pivot angle and a maximum pivot angle, each wind turbine blade extending between an outer tip and an inner tip, wherein each wind turbine blade has an outer portion extending between the hinge and the outer tip and having a first length, and inner portion extending between the hinge and the inner tip and having a second length, wherein a coning angle of the blade carrying structure is larger than zero and/or a tilt angle of the rotor axis is larger than zero, and wherein a horizontal distance from the tower at a vertical position defined by a position of the hinge at tower (Continued)

passage to a point of connection between the blade carrying structure and the hub is equal to or less than the second length.

20 Claims, 7 Drawing Sheets

(56) References Cited

U.S. PATENT DOCUMENTS

| | | | |
|---|---|---|---|
| 400,230 A | | 3/1889 | Lefever |
| 612,464 A | | 10/1898 | Steward |
| 1,178,729 A | * | 4/1916 | Kemble ................ F03D 7/0224 416/11 |
| 4,197,056 A | * | 4/1980 | Hutter ................... F03D 1/0608 416/142 |
| 4,533,297 A | * | 8/1985 | Bassett ................. F03D 1/0658 416/11 |
| 4,632,637 A | * | 12/1986 | Traudt .................. F03D 7/0224 416/41 |
| 6,974,307 B2 | * | 12/2005 | Antoune ............... F03D 7/0216 416/150 |
| 2011/0142672 A1 | | 6/2011 | Koegler et al. |

FOREIGN PATENT DOCUMENTS

| | | |
|---|---|---|
| JP | 2010071277 A | 4/2010 |
| WO | 2016203557 A1 | 12/2016 |
| WO | 2021093924 A1 | 5/2021 |

OTHER PUBLICATIONS

PCT, International Search Report for Application PCT/DK2020/050305 dated Sep. 2, 2021.
PCT, Written Opinion of The International Searching Authority for Application PCT/DK2020/050305 dated Sep. 2, 2021.

* cited by examiner

HINGED BLADE WIND TURBINE WITH TILTED AXIS AND/OR CONED ROTOR

FIELD OF THE INVENTION

The present invention relates to a wind turbine comprising a tower, a nacelle and a hub comprising a blade carrying structure and a use of such wind turbine. One or more wind turbine blades are each pivotally connected to the blade carrying structure via a hinge. The wind turbine of the invention further comprises a tilted rotor axis and/or a coned blade carrying structure.

BACKGROUND OF THE INVENTION

Wind turbines are normally controlled in order to provide a desired power output and in order to control loads on the wind turbine. For horizontal axis wind turbines, i.e. wind turbines with a rotor which rotates about a substantially horizontal rotational axis, this may be obtained by controlling a pitch angle of the wind turbine blades. In this case the angle of attack of the wind turbine blades relative to the incoming wind is adjusted by rotating the wind turbine blades about a longitudinal axis.

Traditional pitch control as described above requires sensor based controllers as well as mechanical parts, e.g. in the form of pitch bearings and drive units. Such controllers and mechanical parts require maintenance. This may be difficult in the case that the wind turbine is positioned at a remote location. In this case failure or breakdown may lead to extensive downtime, e.g. due to long transportation time for maintenance personnel or long delivery time on spare parts. It is therefore desirable to provide a wind turbine which can be controlled in a simple manner, and where the maintenance requirements are reduced as compared to traditional pitch controlled wind turbines.

U.S. Pat. No. 4,632,637 discloses a high speed, downwind horizontal axis wind turbine having three circumferentially spaced lightweight blades having inner support arms radially outwardly disposed blade segments which are pivotally connected to the support arms, so as to fold straight downwind under high wind conditions or high rotating speeds.

DESCRIPTION OF THE INVENTION

It is an object of embodiments of the invention to provide a wind turbine with hinged wind turbine blades, in which the wind turbine blades can be folded inwards at high wind speeds and/or high rotational speeds, and wherein static and/or dynamic load(s) at or within the wind turbine is reduced.

According to a first aspect of the invention, there is provided a wind turbine comprising:
a tower,
a nacelle mounted on the tower,
a hub mounted rotatably on the nacelle,
a blade carrying structure connected to the hub,
one or more wind turbine blades connected to the blade carrying structure via a hinge, each wind turbine blade thereby being arranged to perform pivot movements relative to the blade carrying structure between a minimum pivot angle and a maximum pivot angle, each wind turbine blade extending between an outer tip and an inner tip,
wherein each wind turbine blade has:
an outer portion extending between the hinge and the outer tip and having a first length ($L_1$), and
an inner portion extending between the hinge and the inner tip and having a second length ($L_2$),
wherein a coning angle of the blade carrying structure is larger than zero and/or a tilt angle of the rotor axis is larger than zero,
and wherein a horizontal distance ($L_0$) from the tower at a vertical position defined by a position of the hinge at tower passage
to
a point of connection between the blade carrying structure and the hub
is equal to or less than the second length ($L_2$).

A possible advantage of the present invention may be that it enables reducing the required magnitude of a force (F) applied at the inner tip (at a position displaced $L_2$ with respect to the hinge axis) for generating a torque ($\tau=L_2\times F$) for pivoting each of the one or more blades around their respective hinges (note that vectors, such as F, $\tau$, $L_2$ and F, are indicated with bold font). While it might in general be advantageous to increase the second length ($L_2$) a limitation for the second length ($L_2$) is in general given at least by a horizontal distance between the hinge and the tower at a vertical position defined by a position of the hinge at tower passage. However, by having a coning angle of the blade carrying structure being larger than zero and/or a tilt angle of the rotor axis being larger than zero, the distance between the hinge and the tower at a vertical position defined by a position of the hinge at tower passage is relatively larger with respect to a wind turbine with zero coning angle and/or tilt angle, which in turn enables that the second length ($L_2$) can be relatively larger.

Another possible advantage of having a relatively larger second length ($L_2$) is that a relatively large inner area (such as an area inside a circular cylinder coaxial with the rotor axis and having a surface tangential to the one or more hinges) may be swept by the inner portion. This may in particular be advantageous at low and/or medium wind speeds, where it is beneficial to extract as much energy as possible from the wind.

Another possible advantage of having a relatively larger second length ($L_2$) is that it might be desirable to have a centre of mass of the wind turbine blade being positioned at or close to an inner portion side of a plane traversing the hinge and being orthogonal to a line traversing both the inner tip and the outer tip, and this positioning of the centre of mass may be achieved with less mass (such as less mass in the inner portion) in case of relatively larger second length ($L_2$).

The horizontal distance $L_0$ may be seen as a distance between the tower at a vertical (height-)position where the hinge passes the tower and the point of connection between blade carrying structure and the hub, i.e., a distance between two parallel, vertical planes, where one plane is intersecting or being tangential to the tower in the horizontal plane grazed by the hinge during tower passage and the other plane is intersecting the point of connection between the blade carrying structure and the hub.

The wind turbine of the invention comprises a tower, such as a vertical tower, such as a tower with an axis being parallel with a vertical axis, with a nacelle mounted thereon. The tower may by tubular, such as comprising, such as consisting of a single tubular element. The tower may have a circularly symmetrical, such as a circular, cross-section (in a horizontal plane), at least at a vertical position a vertical position defined by a position of the hinge at tower passage.

The nacelle may be a traditional nacelle having an outer wall enclosing an interior of the nacelle, the nacelle housing various components of the wind turbine, such as generator, drive train, etc. As an alternative, the nacelle may simply be a structure, such as a structure capable of performing yawing movements relative to the tower, where some or all of the components described above may be arranged outside the (nacelle) structure, e.g. in an interior part of the tower.

A hub is mounted rotatably on the nacelle. The hub comprises a blade carrying structure having one or more wind turbine blades connected thereto. Accordingly, the wind turbine blades rotate along with the hub and the blade carrying structure relative to the nacelle.

The wind turbine is preferably a horizontal axis wind turbine.

Each of the wind turbine blades defines an aerodynamic profile having a chord which varies along a length of the wind turbine blade between an inner tip end and an outer tip end. The aerodynamic profile may have a suction side and a pressure side, the suction side and the pressure side both extending between a leading edge and a trailing edge of the aerodynamic profile. The leading edge and the trailing edge each extends between the inner tip end and the outer tip end, Thus, the leading edge as well as the trailing edge extends along the entire length of the wind turbine blade.

In the present context the term 'inner tip end' should be interpreted to mean an extremity of the wind turbine blade which is arranged closest to the hub. Similarly, in the present context the term 'outer tip end' should be interpreted to mean an extremity of the wind turbine blade which is arranged furthest away from the hub. It should be noted that the terms 'closest to the hub' and 'furthest away from the hub' refer to the positions of the tip ends within a pivot angle interval which occurs during normal operation of the wind turbine. Thus, each wind turbine blades extends along a longitudinal direction between the inner tip end and the outer tip end of the wind turbine blade. In the present context the term 'longitudinal direction' should be interpreted to mean a direction in which the wind turbine blade is longer than in any other direction, wherein it is encompassed that the blade might or might not form a straight line between the inner tip and the outer tip. Thus, the inner tip end and the outer tip end form extremities of the wind turbine blade in this longitudinal direction.

The wind turbine blade may have an inner portion with a second length ($L_2$) of within, e.g., 10-20 m, such as 14.5 m, an outer portion with a first length ($L_1$) within, e.g., 50-100 m, such as 73.5 m, and a distance ($L_3$) from the hinge to the rotor axis along a straight line traversing the point of connection between the blade carrying structure and the hub within 25-75 m, such as 51 m. In a particular embodiment, a wind turbine is provided with $L_1$=73.5 m, $L_2$=14.5 m, $L_3$=51 m and furthermore in this particular embodiment a coning angle of the blade carrying structure is 12.5° and/or a tilt angle of the rotor axis is 3.5°. In another particular embodiment, a wind turbine is provided with $L_2$=15.7 m, $L_1$=72 m, $L_3$=53.7 m, a coning angle of the blade carrying structure of 13.5° and the tilt angle of the rotor axis of 3.5°. In an embodiment a coning angle of the blade carrying structure is 3° and/or a tilt angle of the rotor axis is 6°. It may be advantageous to have the sum of the coning angle of the blade carrying structure and the tilt angle of the rotor axis being at least 10°, such as at least 15°, such as at least 19°, in order to avoid collisions between the inner or outer tip of a blade and the tower.

Each of the wind turbine blades is connected to the blade carrying structure via a hinge at a hinge position of the wind turbine blade. Thereby each wind turbine blade is arranged to perform pivot movements relative to the blade carrying structure, via the hinge. The pivoting movements preferably take place about a pivot axis which is arranged substantially perpendicular to the longitudinal direction of the wind turbine blade. Accordingly, during pivoting movements of the wind turbine blades, the inner tip end and the outer tip end are the portions of the wind turbine blades, on either side of the hinge position, which are moved the longest distance, and the longitudinal direction of the wind turbine blade is pivoted.

A pivot angle is thereby defined between each wind turbine blade and the blade carrying structure, depending on the position of the hinge and thereby of the wind turbine blade relative to the blade carrying structure. Accordingly, the pivot angle defines the direction along which a given wind turbine blade extends relative the blade carrying structure, and thereby relative to the hub. This, in turn, determines a diameter of the rotor, and thereby the ability of the wind turbine to extract energy from the wind.

The hinge may be or comprise a bearing, e.g. in the form of a journal bearing, a roller bearing, or any other suitable kind of bearing. The hinge position of each wind turbine blade may be at a position defining a maximum chord and/or at a position defining a maximum thickness of the wind turbine blade and/or at a position defining a maximum thickness-to-chord ratio. The hinge of each of the wind turbine blades may be embedded in the wind turbine blade or the hinge may be attached to an outer surface of the wind turbine blade.

The pivot angle can vary between a minimum pivot angle, defining a minimum rotor diameter, and a maximum pivot angle, defining a maximum rotor diameter.

The hinge position is arranged on the wind turbine blade at a distance, corresponding to the second length ($L_2$), from the inner tip end and at a distance, corresponding to the first length ($L_1$), from the outer tip end. Accordingly, the wind turbine blade is hinged to the blade carrying structure at a position which is not at an end of the wind turbine blade, contrary to conventional pitch controlled wind turbines, where the wind turbine blades are attached to the hub at a root end of the wind turbine blade.

By 'coning angle of the blade carrying structure' is understood an angle (wherein the angle is understood to be the smallest angle, i.e., the angular value being always less than 90°) between the rotor plane and a line between the hinge and a point of connection between the blade carrying structure and the hub. It is understood that a coning angle larger than zero implies that the hinge is spaced apart with respect to the rotor plane in a direction away from the tower.

By 'a point of connection between the blade carrying structure and the hub' may be understood an inner point of connection between the blade carrying structure and the hub, such as a point of the connection being closest to the tower axis in a direction along the rotor axis and/or a point along the rotor axis at which the hub and the blade carrying structure structurally splits into a number of branches corresponding to the number of wind turbine blades.

By 'rotor plane' is for any part of the rotor understood the plane within which that part rotates and said plane is defined as having its normal vector being parallel with the rotor axis.

By 'tilt angle of rotor axis' is understood an angle between the rotor axis and a horizontal plane. It may be understood that the rotor axis is co-incident with an axis of the main shaft, such as an axis of the main shaft going through the rotor centre. It is understood that a larger than zero tilt angle implies that the rotor axis is pointing upwards in a direction away from the tower axis and/or the nacelle and towards the hub (such as the vertical position increases upwards along the rotor axis in the wind direction for a downwind wind turbine and against the wind direction for an upwind wind turbine).

The horizontal distance ($L_0$) is understood to be the smallest horizontal distance, such as between any part of the tower and the point of connection. Horizontal distance is measured from any part of the tower, such as an outer surface of a tower wall.

Distances are understood to be measured during standstill at zero wind. Each of the horizontal distance ($L_0$), the first length ($L_1$), the second length ($L_2$) and the third length ($L_3$) is larger than zero.

In embodiments the tilt angle is within the interval [0.1°; 20.0°], such as [1.0°; 15.0°], such as [2.0°; 10.0°], such as [2.5°; 5.0°], such as [3.0°; 4.0°], such as 3.5°. An advantage of having a tilt angle larger than zero, such a within said interval, may be that it enables moving the hinge away from the tower axis. Another possible advantage may be that tilt entails zero or little decrease in swept area. Another possible advantage may be that a tilt larger than zero does not increase a torque or moment at a bearing (such as a bearing for the nacelle, hub and rotor) around a horizontal axis being orthogonal to the rotor axis and intersecting the rotor axis at, e.g., due to a centre of mass of nacelle, hub and rotor not being moved away from the tower axis with rotor axis tilting.

In embodiments the coning angle is within the interval [0.1°; 45.0°], such as [1.0°; 40.0°], such as [2.5°; 30.0°], such as [5.0°; 20.0°], such as [7.5°; 25.0°], such as [10.0°; 20.0°], such as [10.0°; 15.0°], such as 12.5°. An advantage of having a coning angle larger than zero, such a within said interval, may be that it enables moving the hinge away from the tower axis.

Each of the wind turbine blades may have a centre of mass for the wind turbine blade being positioned at an inner portion side of a plane traversing the hinge and being orthogonal to a line traversing both the inner tip and the outer tip, such as between the hinge position and the inner tip end of the wind turbine blade and/or within a distance of said plane being equal to or less than 20%, such as equal to or less than 10%, such as equal to or less than 5%, such as equal to or less than 2%, such as equal to or less than 1%, of a fourth length given by a total distance from the inner tip to the outer tip. According to this embodiment, the diameter of the rotor is automatically reduced as the rotational speed of the hub increases. Alternatively or additionally, aerodynamic forces acting on the aerodynamic profiles of the wind turbine blades may cause the wind turbine blades to pivot in such a manner that the diameter of the rotor is reduced as the wind speed increases. In an embodiment, the centrifugal force and the aerodynamic forces cooperate in reducing the rotor diameter as the wind speed increases, i.e. they are not counteracting each other.

In embodiments, the wind turbine is further comprising a biasing mechanism arranged to apply a biasing force to the one or more wind turbine blades which biases the one or more wind turbine blades towards the maximum pivot angle and/or the minimum pivot angle. The biasing force may be a pulling force and/or a pushing force applied on the wind turbine blade.

The biasing force could, e.g., be applied by means of a wire attached to the inner portion of the wind turbine blade, which pulls the wind turbine blade, such as towards the maximum pivot angle.

As an alternative, the biasing force could be applied by means of one or more springs acting on the wind turbine blade, e.g. compressible springs arranged for pulling or pushing the wind turbine blade towards, e.g., the maximum pivot angle.

As another alternative, the biasing force could be in the form of a moment. In this case the biasing force could be applied by means of a torsional spring arranged in the hinge which pulls or pushes the wind turbine blade towards, e.g., the maximum pivot angle.

As another alternative, the biasing force could be applied by means of a hydraulic mechanism connected to the wind turbine blade and being arranged for pulling or pushing the wind turbine blade towards, e.g., the maximum pivot angle.

The biasing mechanism may be attached to the wind turbine blade by means of a suitable connecting interface, e.g., including a hook, an eyelet or the like.

It is noted that the biasing mechanism may be arranged to only bias the one or more wind turbine blades towards the maximum pivot angle, such as via pulling or pushing, or to only bias the one or more wind turbine blades towards the minimum pivot angle, such as via pulling or pushing, or arranged to both (depending on the circumstances) be arranged to bias the one or more wind turbine blades towards the maximum pivot angle and the minimum pivot angle (at different points in time), such as via pulling and/or pushing. A possible advantage of biasing may be that it enables (controlled) pivoting of the blade. In embodiments the biasing force is applied as a force acting on the inner portion of each of the one or more wind turbine blades, such as at a distal (such as the most distal 25%, 20%, 10% or 5%) portion of the inner portion of the blade, where 'distal' is with respect to the hinge (i.e., the force is applied at the end of the inner portion opposite the hinge), wherein the force has a direction comprising, such as consisting of, a tangential component with respect to the hinge axis.

According to embodiment with a biasing mechanism, the wind turbine blades may be arranged by the biasing mechanism to be in a position providing a minimum or maximum rotor diameter, in particular when no other forces act on the wind turbine blades.

In particular, when the wind speed is low and the hub therefore does not rotate, or only rotates at a low rotational speed, no or only a small centrifugal force acts on the wind turbine blades. Since the biasing means may bias the wind turbine blades towards a maximum rotor diameter, the rotor diameter can be arranged to be large under these conditions. Thereby it is ensured that the wind turbine is capable of extracting as much energy as possible from the wind. It is also ensured that the wind turbine blades are actually in a position where they are capable of catching the wind and cause the hub to rotate once the wind speed increases. On the other hand, when the wind speed is higher, the hub rotates at a higher rotational speed, and thereby the centrifugal force acting on the wind turbine blades is larger. At some point the aerodynamic and centrifugal forces may become sufficiently large to at least partly overcome the biasing force of the biasing means (such as in case of a passive biasing means, such as based on gravity and/or a spring force), and thereby the wind turbine blades may start pivoting towards a position defining a minimum rotor diameter, i.e. the rotor diameter decreases. Due to the biasing force it may be ensured that this decrease in rotor diameter is obtained in a smooth and gradual manner.

The wind turbine may further comprise end stop mechanisms arranged to slow pivot movements of the wind turbine blades in a region near the minimum pivot angle and/or in a region near the maximum pivot angle. The end stop mechanism may comprise a spring and/or a damper. The wind turbine may further comprise a stop mechanism arranged to move the wind turbine blades to a safe pivot angle, e.g., in the case of an emergency. The safe pivot angle may arrange at least the outer end of each wind turbine blade along a direction which is substantially parallel to a rotational axis of the hub. This position of the wind turbine blades defines a minimum rotor diameter and is sometimes referred to as 'barrel mode', In the case that the stop mechanism is activated for other reasons than an emergency, the safe pivot angle may arrange the wind turbine blades at a small angle with respect to the rotational axis of the hub. This angle may be dependent on the wind speed.

A wind turbine according to any one of the preceding claims, wherein a ratio ($L_2/L_1$) between the second length ($L_2$) and the first length ($L_1$) is within the interval [0.01; 0.50], such as [0.5; 0.40], such as [0.10; 0.30], such as [0.15; 0.25], such as 0.20. A wind turbine according to any one of the preceding claims, wherein a ratio ($L_2/L_3$) between the second length ($L_2$) and a third length ($L_3$), wherein the third length ($L_3$) is given by a distance from the hinge to the rotor axis along a straight line traversing the point of connection between the blade carrying structure and the hub, is within the interval [0.01; 0.90], such as [0.01; 0.50], such as [0.10; 0.45], such as [0.20; 0.40], such as 0.28.

In general, a distance between an axis of the hinge and the rotor axis is equal to or larger than the second length ($L_2$). The hinge axis may be arranged substantially orthogonal to, such as orthogonal to, the rotor axis. The hinge axis may be arranged substantially tangentially, such as tangentially, with respect to the rotor axis.

In embodiments the nacelle is mounted on the tower via a yaw system. Thus, the wind turbine comprises a tower with a nacelle mounted thereon, via a yaw system. Accordingly, the nacelle can rotate about a substantially vertical rotational axis, relative to the tower, in order to direct a rotor of the wind turbine into the incoming wind. The yaw system may be an active yaw system in which the nacelle is rotated actively by means of a yaw drive mechanism, e.g. on the basis of measurements of the wind direction. As an alternative, the yaw system may be a passive yaw system in which the nacelle automatically rotates according to the wind direction without the use of a yaw drive mechanism.

In embodiments the blade carrying structure comprises one or more arms, each wind turbine blade being mounted on one of the arms. Each of the one or more arms bay be an elongated element, such as a straight elongated element, extending from the hub to the hinge of the wind turbine blade. In case each wind turbine blade is being mounted on one of the arms, the point of connection between the blade carrying structure and the hub is given by an intersection between the hub and the axis of the arm. In embodiments an axis of each arm makes an angle with respect to a plane, such as the rotor plane, being orthogonal to the rotor axis wherein said angle is corresponding to the coning angle.

In embodiments the outer blade part extends from the hinge region along a first direction and the inner blade part extends from the hinge region along a second direction, and wherein the first direction and the second direction form an angle, $\alpha$, there between, where $0°<\alpha<90°$. Accordingly, a bend is defined along the length of the wind turbine blade, more particularly in the hinge region. The bend may be defined exactly at the hinge position, i.e. exactly where the wind turbine blade is hinged to the blade carrying structure. Alternatively, the bend may merely be defined in the hinge region, i.e. at a position near the hinge. The angle, $\alpha$, may be within a range of 5° to 45°, such as between 10° and 40°, such as between 15° and 35°, such as between 20° and 30°, such as approximately 25°. The angle $\alpha$ is understood to be measured between a first vector from the inner tip to the hinge and a second vector from the hinge to the outer tip, such as wherein for a straight wind turbine blade where the inner- and outer portion are parallel, the angle, $\alpha$ is zero. An advantage of the bend may be that it enables increasing a pivoting torque around the hinge axis originating from centrifugal forces acting on the inner portion, partially because the bend can be arranged to move mass further away from the rotor axis (i.e., increasing the centrifugal forces), partially because it can be arranged to minimize an angle between the rotor axis and vectors originating from the hinge axis to parts of the inner portion (i.e., maximize pivoting torque for the a given radially oriented centrifugal force acting on the inner portion).

In embodiments the wind turbine is a downwind wind turbine, According to these embodiments, the rotor faces away from the incoming wind, i.e. the wind reaches the wind turbine blades after having passed the nacelle. Downwind wind turbines are very suitable for applying passive yaw systems, i.e. yaw systems which automatically direct the rotor of the wind turbine towards the incoming wind without the use of yaw drives and control systems. This further reduces the need for components which are prone to require maintenance. Furthermore, in downwind wind turbines a passive cooling system can be arranged upwind with respect to the rotor, thereby enabling improved cooling of various wind turbine components.

As an alternative, the wind turbine may be an upwind wind turbine, in which case the rotor faces the incoming wind.

In embodiments an angular interval between a minimum pivot angle and a maximum pivot angle comprises an angle at which a distance between the inner portion of at least one blade within the one or more blades and the tower is a global minimum, such as wherein said angular interval comprises one or more angular values, optionally on both sides of said angle, for which said distance is larger. It may be understood that the global minimum is understood to be the smallest distance exhibited during a full ($2\pi$ or 360°) rotation. In other words, there is an angle within said minimum-maximum interval at which the inner portion is as close as it can get—for any angle—to the tower.

According to a second aspect of the invention there is provided use of a wind turbine according to the first aspect for producing electrical power.

According to a third aspect of the invention there is provided a method for controlling a wind turbine according to the first aspect, said method comprising pivoting at least one blade within the one or more blades.

In embodiments the method comprises pivoting the at least one blade into a pivot angle at which pivot angle a distance between the inner portion of at least one blade within the one or more blades and the tower is a global minimum.

BRIEF DESCRIPTION OF THE DRAWINGS

The invention will now be described in further detail with reference to the accompanying drawings in which.

DETAILED DESCRIPTION OF THE DRAWINGS

Figure 1:
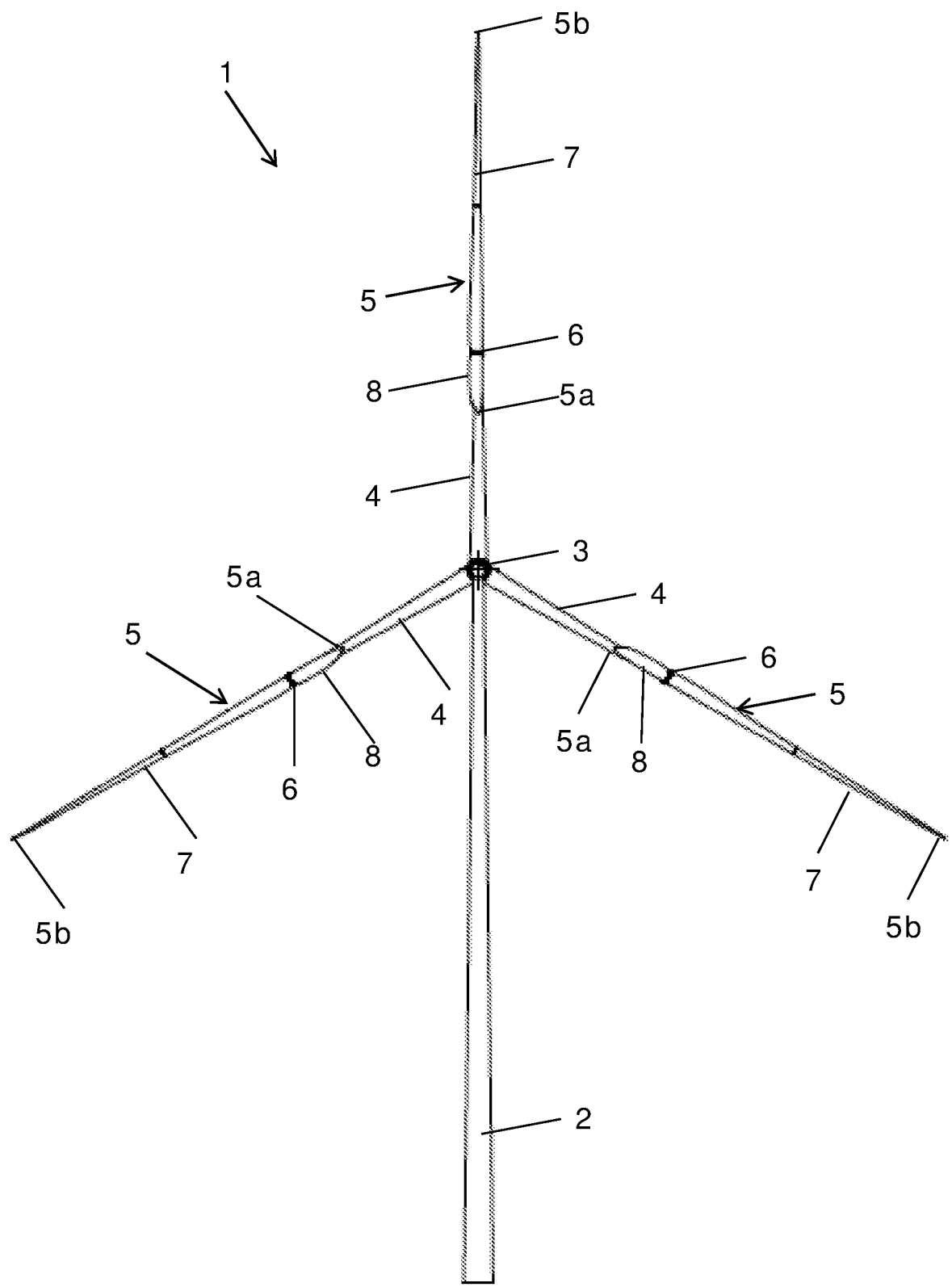
FIG. 1 is a front view of a wind turbine according to an embodiment of the invention.

FIG. 1 is a front view of a wind turbine 1 according to an embodiment of the invention. The depicted wind turbine 1 is a downwind wind turbine and comprises a tower 2 and a nacelle (not visible) mounted on the tower 2 via a yaw system. A is hub 3 mounted rotatably on the nacelle, the hub 3 comprising a blade carrying structure 4 with three arms. Three wind turbine blades 5 are each connected to the blade carrying structure 4 via a hinge 6 in a hinge region of the wind turbine blade 5. The wind turbine blade 5 is thereby arranged to perform pivot movements relative to the blade carrying structure 4 between a minimum pivot angle and a maximum pivot angle.

Each wind turbine blade 5 defines an aerodynamic profile between an inner tip 5a and an outer tip 5b. The hinge 6 is arranged at a distance from the inner tip 5a and at a distance from the outer tip 5b. Thereby an outer blade part 7, extending between the hinge 6 and the outer tip 5b, and an inner blade part 8, extending between the hinge 6 and the inner tip 5a, are defined.

The hinge 6 allows the wind turbine blade 5 to perform pivot movements relative to the blade carrying structure 4. A pivot angle is thereby defined between the wind turbine blade 5 and the blade carrying structure 4, depending on the position of the hinge 6 and thereby of the wind turbine blade 5 relative to the blade carrying structure 4. This determines a diameter of the rotor, and thereby the ability of the wind turbine 1 to extract energy from the wind.

Figure 2:
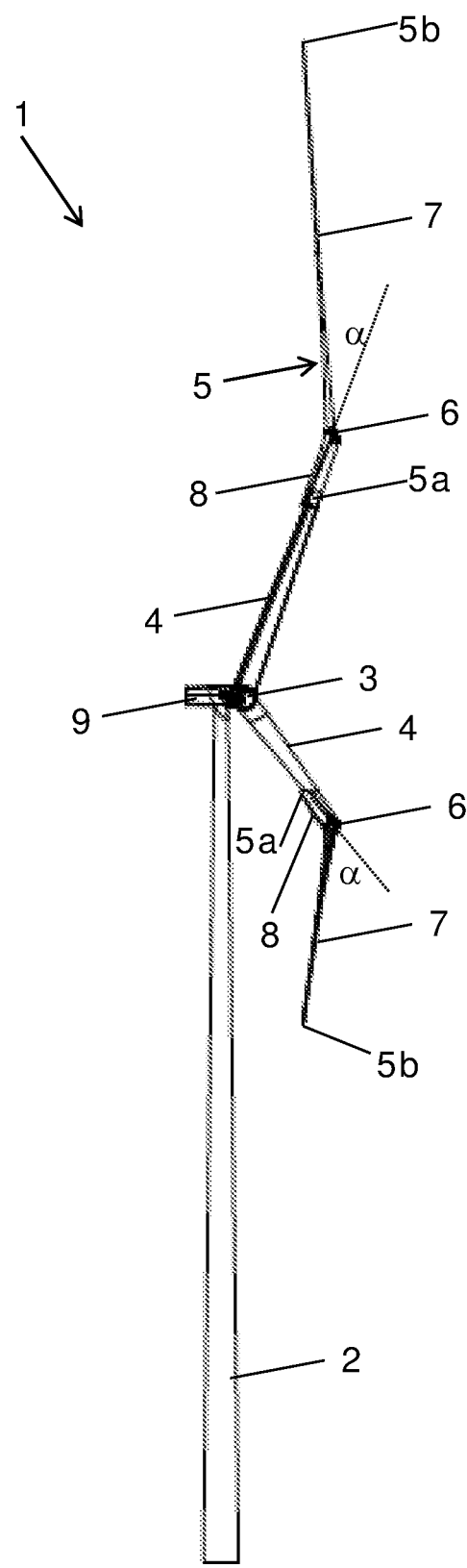
FIGS. 2-4 are side views of the wind turbine of FIG. 1 with the wind turbine blades at three different pivot angles.
Figure 3:
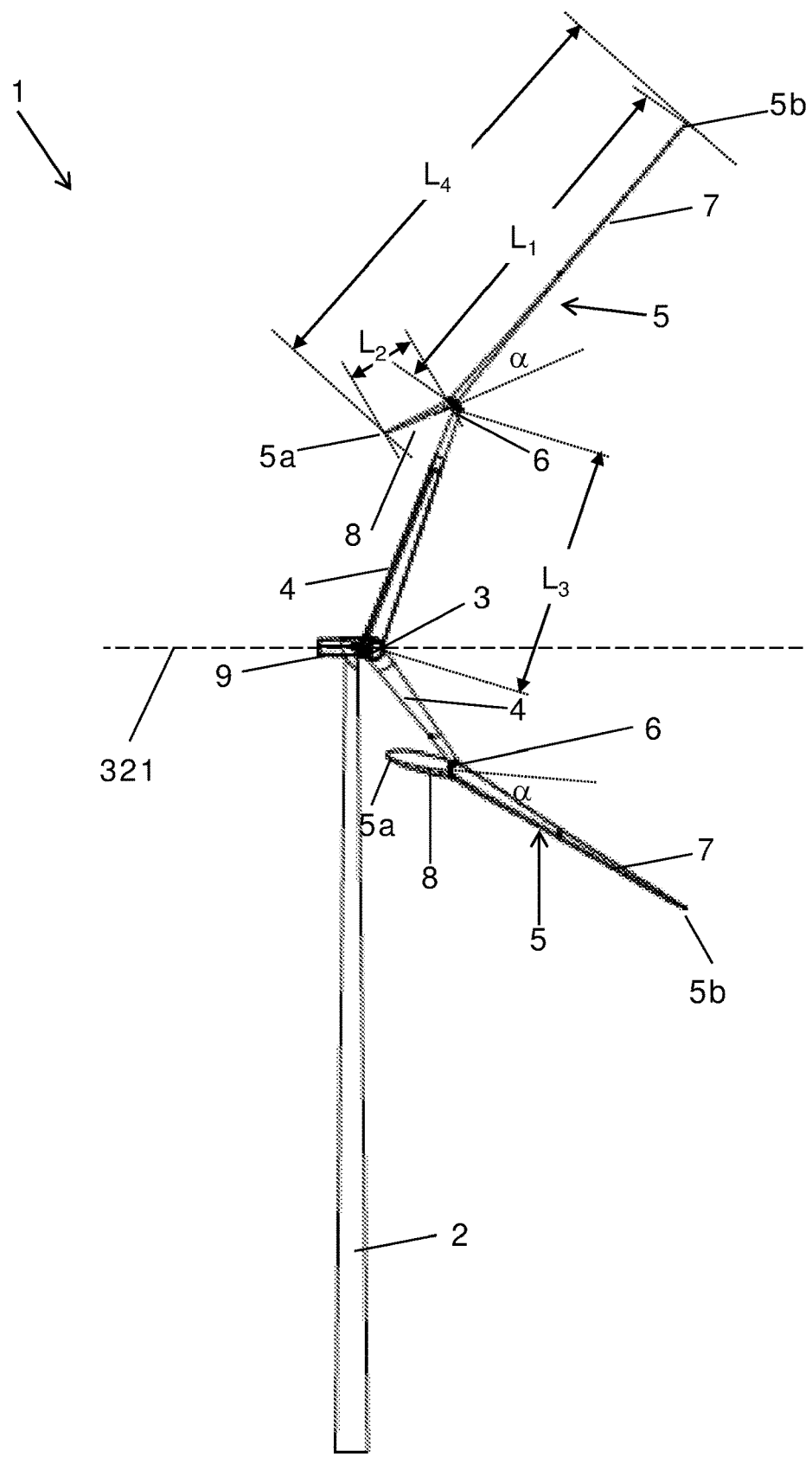
Figure 4:
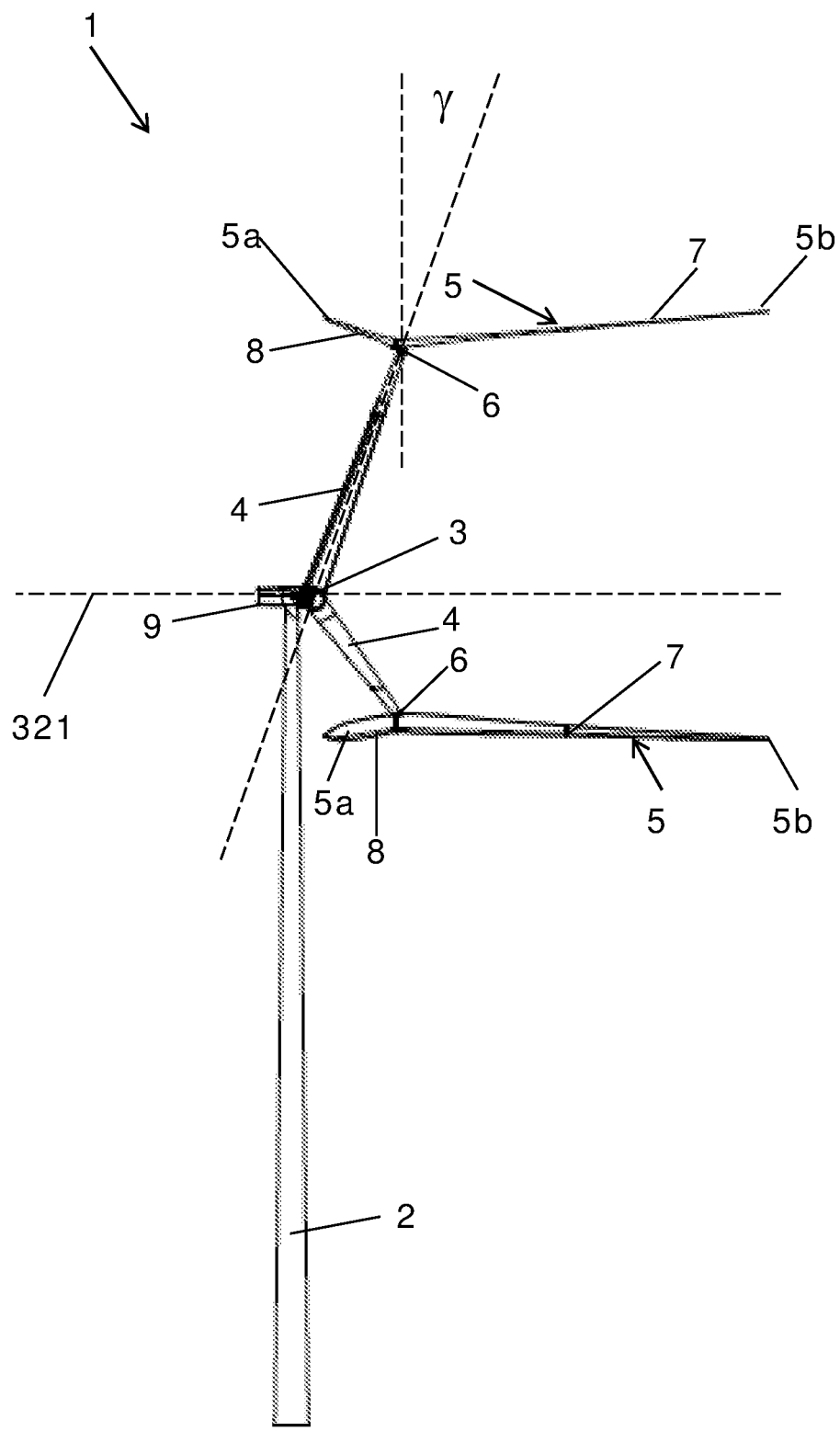

The outer blade part 7 extends from the hinge 6 along a first direction and the inner blade part 8 extends from the hinge 6 along a second direction. The first direction and the second direction form an angle, α, there between. The wind turbine blade 5 thereby forms a bend at or near the hinge 6. In FIGS. 2-4 it can be seen that α is approximately 25°, and that it is in a flap-wise direction. It can further be seen that the bend is formed approximately at the position of the hinge 6.

FIGS. 2-4 are side views of the wind turbine 1 of FIG. 1 with the wind turbine blades 5 at three different pivot angles. The pivot angle can vary between a maximum pivot angle, defining a maximum rotor diameter, as shown in FIG. 2, and a minimum pivot angle, defining a minimum rotor diameter, as shown in FIG. 4. FIG. 3 shows the wind turbine blades 5 at an intermediate pivot angle between the maximum and minimum rotor diameter, i.e., maximum and minimum pivot angle.

In FIG. 2 the wind turbine blade 5 is arranged in a position defining maximum pivot angle, and thereby maximum rotor diameter. Accordingly, the inner blade part 8 is arranged immediately adjacent to the blade carrying structure 4. The figure shows a bend defined by the angle, α, between the inner blade part 8 and the outer blade part 7. FIG. 2 also shows the nacelle 9.

FIG. 3 shows the wind turbine 1 with the wind turbine blades 5 at a pivot angle between minimum and maximum pivot angle, and a rotor diameter which is decreased compared to the maximum rotor diameter illustrated in FIG. 2. It can be seen that the inner blade part 8 has moved away from the blade carrying structure 4, and that the inner tip 5a has been moved closer to the tower 2. FIG. 3 furthermore indicates a first length $L_1$ of the outer portion (which may generally be interchangeably referred to as outer blade part) 7 extending between the hinge 6 and the outer tip 5b, a second length $L_2$ of the inner portion (which may generally be interchangeably referred to as inner blade part) 8 extending between the hinge 6 and the inner tip 5a, a third length $L_3$ which is given by a distance from the hinge 6 to the rotor axis 321 along a straight line traversing the point of connection between the blade carrying structure and the hub 3, and a fourth length L4 which is given by a total distance from the inner tip 5a to the outer tip 5b.

FIG. 4 shows the wind turbine 1 with the wind turbine blades 5 pivoted such that they define a minimum pivot angle and therefore minimum rotor diameter. Accordingly, the inner blade part 8 has been moved further away from the blade carrying structure 4 and the inner tip 5a has been moved closer to the tower 2. Each hinge 6 is associated with a hinge axis which in the depicted view is orthogonal to the plane of the paper. FIG. 4 furthermore indicates a coning angle, γ, of the coning angle of the blade carrying structure, which in the depicted embodiment comprises an arm 4 which makes an angle with respect to a plane being orthogonal to the rotor axis 321 wherein said angle is corresponding to the coning angle, γ.

Figure 5:
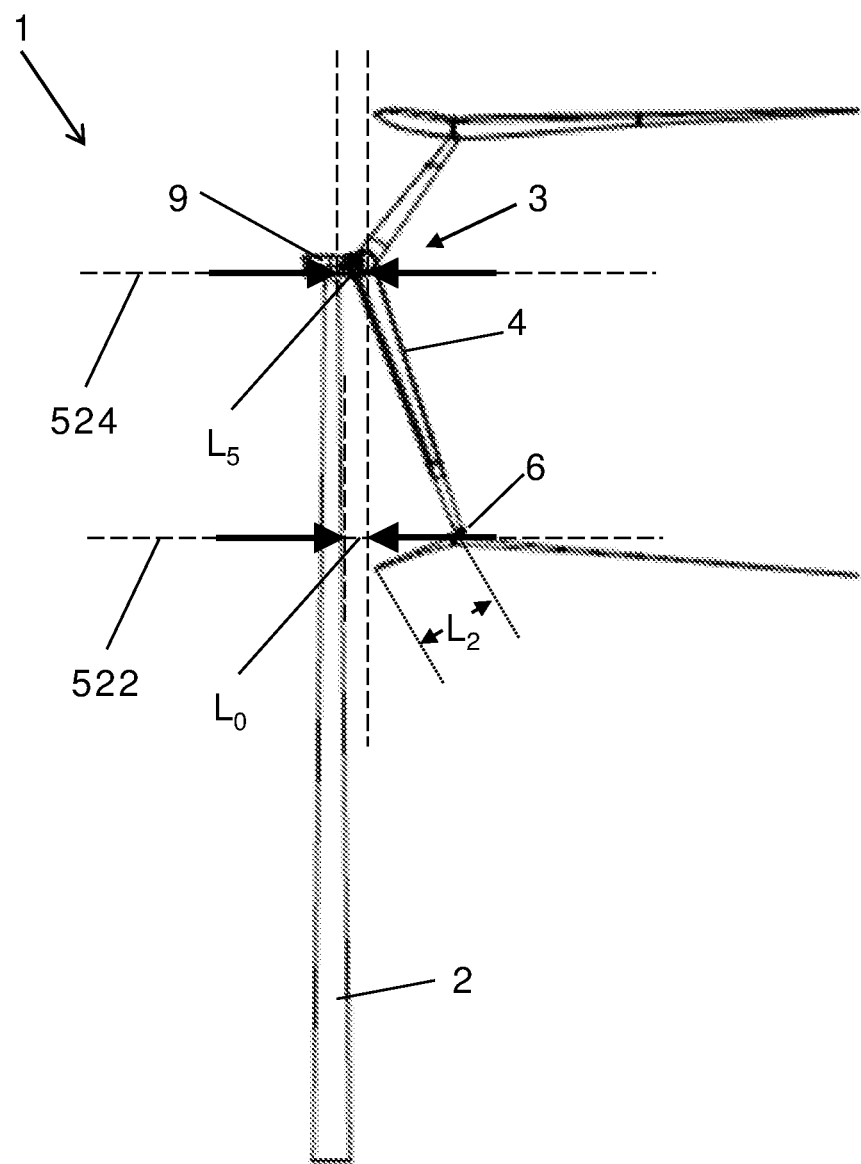
FIG. 5 shows the wind turbine of FIG. 1 with the rotor at another angular position.

FIG. 5 shows the wind turbine 1 with the rotor rotated half a revolution (π or 180°) so that on blade is pointed vertically downwards and is depicted at tower passage. FIG. 5 shows a horizontal (where a horizontal plane is indicated by dashed line 522) distance $L_0$ from the tower 2 at a vertical position defined by a position of the hinge 6 at tower passage (where the point of connection between the blade carrying structure and the hub 3 is defined by the point of connection between the arm 4 and the hub 3). FIG. 5 also indicates the second length $L_2$, which is larger than the horizontal distance $L_0$. FIG. 5 also indicates an (upper) horizontal distance $L_5$ from the tower 2 at a vertical position (as indicated by dashed line 524) at which the tower is abutting the nacelle to a point of connection between the blade carrying structure and the hub, which in the embodiment depicted in FIG. 5 is smaller (due to the conical shape of the tower with a decreasing diameter in an upwards directions) than the (lower) horizontal distance ($L_0$). However, in alternative embodiments the (upper) horizontal distance $L_5$ is larger than the (lower) horizontal distance $L_0$, such as a horizontal distance between the upper part of the tower and the connection between the hub and the hub arm (roughly the "overhang") being smaller than a horizontal distance between the hinge and the tower at tower passage. This may be realized, e.g., by tilting the tower (such as tilting the tower in FIG. 5 so that the upper portion moves towards the right hand side) and/or by arranging the tower with a cross-section being dependent on the vertical position (such as with decreasing diameter in a downwards direction and/or an hour-glass shape with a waist at or close to a vertical position of the hinge during tower passage).

Figure 6:
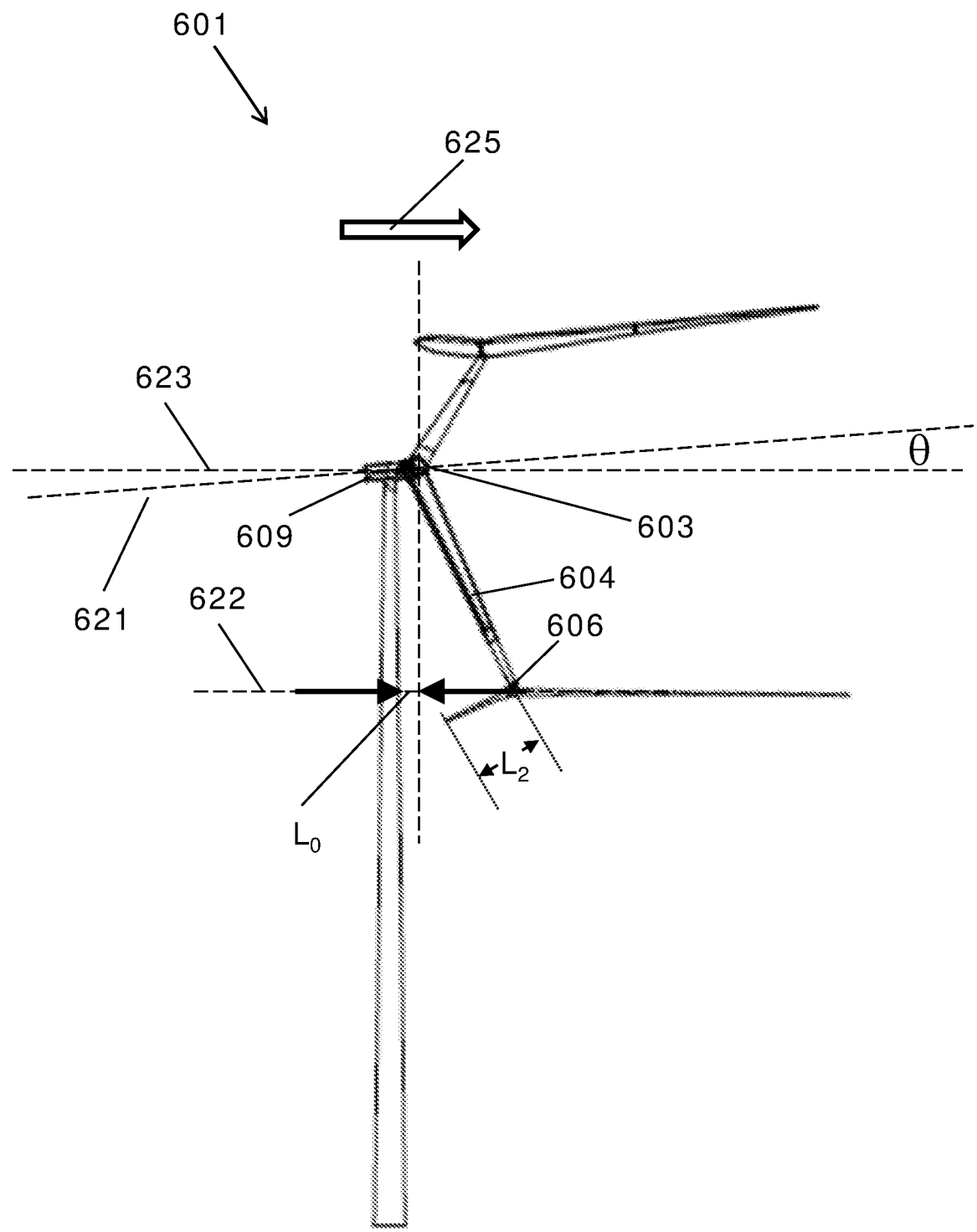
FIG. 6 shows another wind turbine with a tilt angle of the rotor axis being larger than zero.

FIG. 6 shows a downwind wind turbine 601, which is similar to the wind turbine 1 of FIGS. 1-5, except that the wind turbine 601 of FIG. 6 also features a tilt angle, θ, of the rotor axis which is larger than zero, where the tilt angle, θ, is indicated as the angle between the rotor axis 621 and a horizontal plane as indicated by dashed line 623. The larger than zero tilt angle, θ, implies that the rotor axis is pointing upwards in a direction (as indicated by arrow 625), which direction is identical to a wind direction for the downwind wind turbine 601, away from the tower axis and/or the nacelle 609 and towards the hub 603 (such as towards a point on the hub being traversed by the rotor axis and being most distantly placed with respect to the nacelle), which in FIG. 6 is shown as a direction from left to right due to the hub 603 being placed in FIG. 6 on the right hand side of the nacelle 609. FIG. 6 also shows a horizontal (where a horizontal plane is indicated by dashed line 622) distance $L_0$ from the tower 2 at a vertical position defined by a position of the hinge 606 at tower passage (where the point of connection between the blade carrying structure and the hub is defined by the point of connection between the arm 604 and the hub 603). FIG. 6 also indicates the second length $L_2$, which is larger than the horizontal distance $L_0$.

Figure 7:
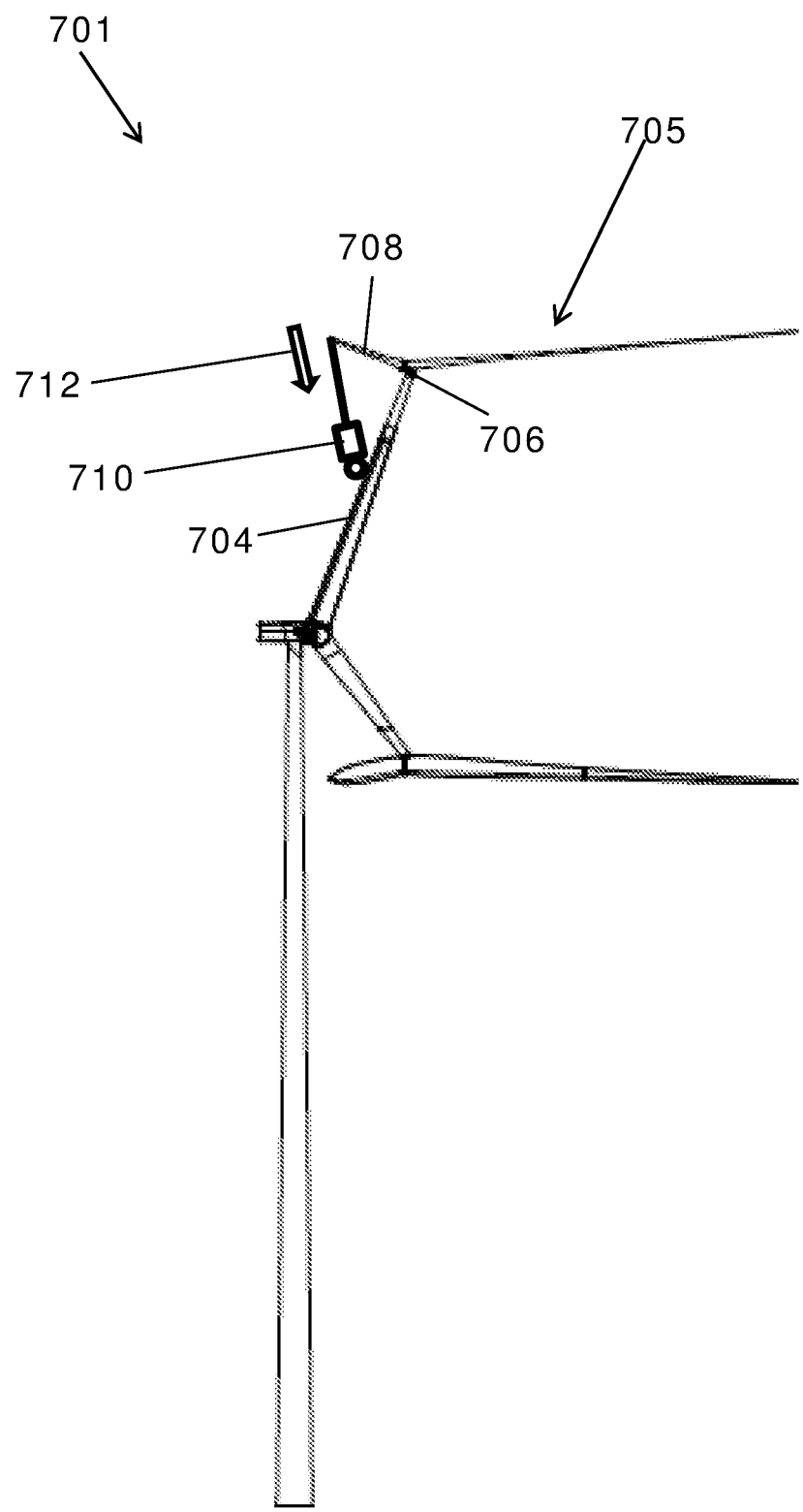
FIG. 7 shows another wind turbine with a biasing mechanism.

FIG. 7 shows a wind turbine 701, which is similar to the wind turbine 1 of FIGS. 1-5, except that the wind turbine 701 of FIG. 7 also features a biasing mechanism 710 in the form of a hydraulic motor mounted on the arm 704 and arranged to exerted a pulling force (in a direction as indicated by the arrow 712) at a point of attack at a distal end of the inner portion 708, which yields a torque, t, around the hinge 706, which in turn goes to rotate the wind turbine blade 705 in a counter-clockwise (in the depicted view) direction around the hinge 706, A similar biasing mechanism is arranged in connection with each wind turbine blade (albeit for clarity only shown in the figure for on wind turbine blade).

According to an alternative to the present invention, there is provided a wind turbine comprising:
a tower, such as a tilting tower, such as a tower having a tower axis making an angle larger (such as at least 1°, 2°, 5° or 10° larger) than zero with respect to vertical,
a nacelle mounted on the tower,
a hub mounted rotatably on the nacelle,
a blade carrying structure connected to the hub,
one or more wind turbine blades connected to the blade carrying structure via a hinge, each wind turbine blade thereby being arranged to perform pivot movements relative to the blade carrying structure between a minimum pivot angle and a maximum pivot angle, each wind turbine blade extending between an outer tip and an inner tip,
wherein each wind turbine blade has:
an outer portion extending between the hinge and the outer tip and having a first length ($L_1$), and
an inner portion extending between the hinge and the inner tip and having a second length ($L_2$),
wherein an upper horizontal distance ($L_5$) from
the tower at a vertical position at which the tower is abutting the nacelle,
to
a point of connection between the blade carrying structure and the hub
is less than a lower horizontal distance ($L_0$) from
the tower at a vertical position defined by a position of the hinge at tower passage
to
a point of connection between the blade carrying structure and the hub
and wherein the lower horizontal distance ($L_0$) is equal to or less than the second length ($L_2$).

According to this alternative, a horizontal distance between on the one side the point of connection between the blade carrying structure and the hub and on the other side the tower, is larger at the lower vertical position where the hinge passes by the tower at tower passage (typically the lowest position of the hinge during rotor rotation) than at the upper position where the tower abuts the nacelle (typically a top part of the tower). The horizontal distance between said point of connection and the tower may thus be increasing in a downwards direction (which may be realized by arranging an axis of the tower to present a non-zero angle with respect to a vertical line and/or arranging an outer shape of the tower facing a plane traced by the hinge during rotation so that a distance to this plane increases in a downwards direction), This may be advantageous for leaving more space for an inner portion with a larger second length ($L_2$), e.g., compared to a tower where said horizontal distance is constant or even increasing in a downwards direction. In an embodiment according to this alternative, such as with a tilted tower, at least a part of the tower is mounted on a foundation via a yaw system.

The invention claimed is:

1. A wind turbine comprising:
a tower;
a nacelle mounted on the tower;
a hub mounted rotatably on the nacelle;
a blade carrying structure connected to the hub; and
one or more wind turbine blades connected to the blade carrying structure via a hinge, each wind turbine blade thereby being arranged to perform pivot movements relative to the blade carrying structure between a minimum pivot angle and a maximum pivot angle, each wind turbine blade extending between an outer tip and an inner tip;
wherein each wind turbine blade has:
an outer portion extending between the hinge and the outer tip and having a first length; and
an inner portion extending between the hinge and the inner tip and having a second length;
wherein a coning angle of the blade carrying structure is larger than zero and/or a tilt angle of a rotor axis is larger than zero;
and wherein a horizontal distance from the tower at a vertical position defined by a position of the hinge at tower passage to a point of connection between the blade carrying structure and the hub is equal to or less than the second length.

2. A wind turbine according to claim 1, wherein the tilt angle is within an interval [0.1°; 20.0°].

3. A wind turbine according to claim 1, wherein the coning angle is within an interval [0.1°; 45.0°].

4. A wind turbine according to claim 1, further comprising a biasing mechanism arranged to apply a biasing force to the one or more wind turbine blades which biases the one or more wind turbine blades towards the maximum pivot angle and/or the minimum pivot angle.

5. A wind turbine according to claim 4, wherein the biasing force is applied as a force acting on the inner portion of each of the one or more wind turbine blades.

6. A wind turbine according to claim 1, wherein a distance between an axis of the hinge and the rotor axis is equal to or larger than the second length.

7. A wind turbine according to claim 1, wherein the nacelle is mounted on the tower via a yaw system.

8. A wind turbine according to claim 1, wherein the blade carrying structure comprises one or more arms, each wind turbine blade being mounted on one of the arms.

9. A wind turbine according to claim 8, wherein an axis of each arm makes an angle with respect to a plane being orthogonal to the rotor axis wherein said angle is corresponding to the coning angle.

10. A wind turbine according to claim 1, wherein the outer portion extends from a hinge region along a first direction and the inner portion extends from the hinge region along a second direction, and wherein the first direction and the second direction form an angle, α, there between, where 0°<α<90°.

11. A wind turbine according to claim 1, wherein the wind turbine is a downwind wind turbine.

12. A wind turbine according to claim 1, wherein an angular interval between the minimum pivot angle and the maximum pivot angle comprises an angle at which a distance between the inner portion of at least one blade within the one or more blades and the tower is a global minimum.

13. A method, comprising:
providing a wind turbine, comprising:
- a tower;
- a nacelle mounted on the tower;
- a hub mounted rotatably on the nacelle;
- a blade carrying structure connected to the hub; and
- one or more wind turbine blades connected to the blade carrying structure via a hinge, each wind turbine blade extending between an outer tip and an inner tip; wherein each wind turbine blade has:
  - an outer portion extending between the hinge and the outer tip and having a first length; and
  - an inner portion extending between the hinge and the inner tip and having a second length;
wherein:
- a coning angle of the blade carrying structure is larger than zero and/or a tilt angle of a rotor axis is larger than zero; and
- a horizontal distance from the tower at a vertical position defined by a position of the hinge at tower passage to a point of connection between the blade carrying structure and the hub is equal to or less than the second length; and
pivoting, each wind turbine blade, between a minimum pivot angle and a maximum pivot angle relative to the blade carrying structure.

14. A method according to claim 13, wherein the method comprises pivoting at least one blade of the one or more blades into a pivot angle at which a distance between the inner portion of the at least one blade and the tower is a global minimum.

15. A method according to claim 13, wherein the tilt angle is within an interval [0.1°; 20.0°].

16. A method according to claim 13, wherein the coning angle is within an interval [0.1°; 45.0°].

17. A method according to claim 13, wherein pivoting comprises applying a biasing force on the inner portion of each of the one or more wind turbine blades to pivot, each wind turbine blade, between the minimum pivot angle and the maximum pivot angle.

18. A wind turbine comprising:
- a tower;
- a nacelle mounted on the tower;
- a hub mounted rotatably on the nacelle;
- a blade carrying structure connected to the hub; and
- one or more wind turbine blades connected to the blade carrying structure via a hinge, each wind turbine blade thereby being arranged to perform pivot movements relative to the blade carrying structure between a minimum pivot angle and a maximum pivot angle, each wind turbine blade extending between an outer tip and an inner tip,
wherein each wind turbine blade has:
- an outer portion extending between the hinge and the outer tip, the outer portion has a first length; and
- an inner portion extending between the hinge and the inner tip, the inner portion has a second length;
wherein a coning angle of the blade carrying structure is larger than zero and/or a tilt angle of a rotor axis is larger than zero, and wherein a sum of the coning angle of the blade carrying structure and the tilt angle of the rotor axis is at least ten degrees, and
wherein a horizontal distance from the tower at a vertical position defined by a position of the hinge at tower passage to a point of connection between the blade carrying structure and the hub is equal to or less than the second length.

19. A wind turbine according to claim 18, further comprising a biasing mechanism arranged to apply a biasing force to the one or more wind turbine blades which biases the one or more wind turbine blades towards the maximum pivot angle and/or the minimum pivot angle.

20. A wind turbine according to claim 18, wherein a distance between an axis of the hinge and the rotor axis is equal to or larger than the second length.

* * * * *